Sept. 23, 1958   B. W. ROWLEY   2,852,968
CUTTING TOOL
Filed April 23, 1956
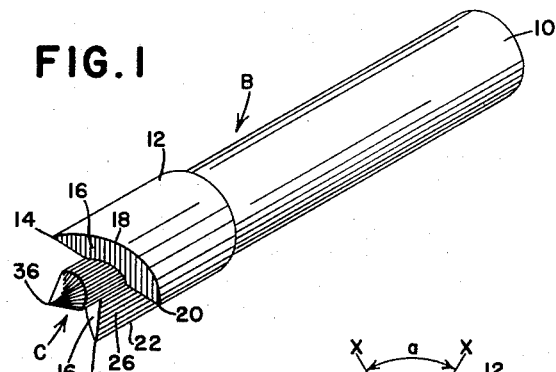
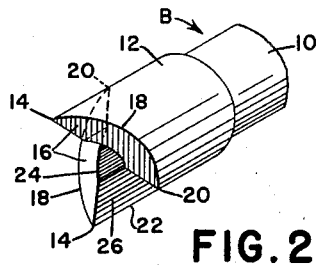
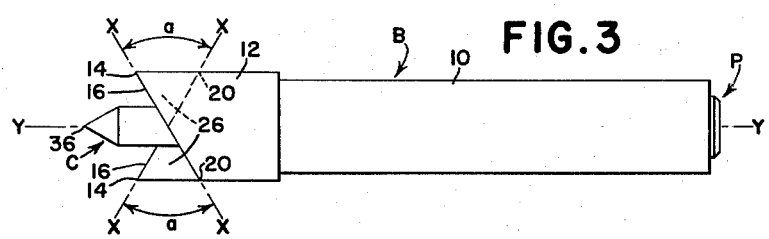
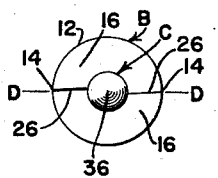
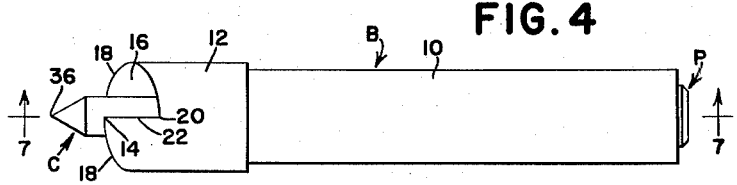
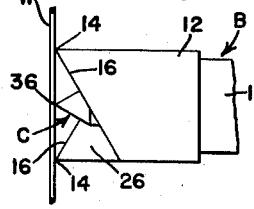
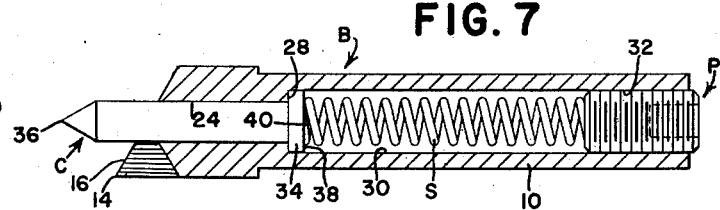
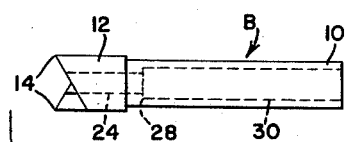
INVENTOR.
B.W. ROWLEY
BY
ATTORNEY United States Patent Office 2,852,968
Patented Sept. 23, 1958

2,852,968
CUTTING TOOL

Benjamin W. Rowley, Davenport, Iowa, assignor, by mesne assignments, to Jancy Engineering Company, a corporation of Iowa Application April 23, 1956, Serial No. 579,812

8 Claims. (Cl. 77—69)

This invention relates to a rotary cutting tool that finds its principal utility with drill presses, electric hand drills and the like and is especially designed for cutting circular holes in light or thin material, an operation heretofore accomplished only by punching because of the inability of former drills to handle thin or light stock.

An important object of the invention is to provide an improved tool which features an axially retractible center point and cutting means concentric with that point. Another object is to provide the means as a pair of diametrically opposed and alined cutting points lying on a circle concenrtic with the centering point and further lying in a radial plane normal to the tool axis. It is a further object to provide the head of the tool as a cylinder having its front end ground or otherwise formed by being cut by a pair of crossed planes diagonal to and intersecting the axis of the cylinder, one at each side of the median plane of the tool, whereby to afford the pair of cutting points and to further afford a pair of semi-circular faces falling away from the respective points and concentric with the cylinder axis. This manner of forming the cutter portion on the head achieves both rake and relief angles in a single operation and further contributes to the ease and facility with which the tool may be sharpened. The feature of the retractible center enables the use of the tool without the requirement for preliminarily center-punching the work. The mounting of the centering member is also such that the member has rotational as well as axial movement relative to the tool body.

The foregoing and other significant objects and desirable features inherent in and encompassed by the invention will become apparent as a preferred embodiment is disclosed by way of example in the ensuing specification and annexed sheet of drawings, the several figures of which are described immediately below.

Figure 1 is a perspective of the tool.

Figure 2 is a perspective of the head of the tool with the centering member removed.

Figure 3 is an elevation of the tool.

Figure 4 is an elevation rotated 90° from Figure 3.

Figure 5 is an end view of the tool as seen in Figure 4.

Figure 6 is a fragmentary elevation showing the tool in operating position and with the center member retracted.

Figure 7 is a section of the line 7—7 of Figure 4.

Figure 8 is an "exploded" view, on a reduced scale, showing the components of the tool and their relationship to each other prior to assembly.

Although the improved tool disclosed here is adapted for work of different dimensional characteristics, it is designed primarily for cutting holes in thin material, as previously stated. As a matter of fact, it is admirably adapted for cutting holes in shim stock, for which no other rotary tool of the drill character has heretofore been adapted. The tool affords outstanding results in the cutting of holes in sheet metal panels, such as in automobile and truck bodys for the installation of radio antennae and other accessories, for example. The tool has marked performance characteristics in that it leaves virtually no burr and it will not fracture paint or a surface on which it is operating. In view of the special utilities noted above—which do not of course exclude others— the tool is primarily of relatively small size, on the order of the scale of Figure 8; although, it is produced, of course, in various customary sizes for cutting holes of other diameters. The foregoing is set forth to indicate the precision character of the tool and the preferred environment in which it is used.

The tool comprises a main tool body B, a centering member C, a centering member biasing means S and a biasing means retainer P, each of which will be particularly described below.

The tool body has a rear chuck-receivable portion or shank 10 by means of which it is mountable in, for example, the chuck of a drill press, electric hand drill, or the like for rotation about its principal axis, the shank being shown here as cylindrical about this axis; although, it may have any shape adapted to the particular chuck or tool holder with which it is used. A front cutter head 12 of cylindrical section is coaxially joined to the shank, the two preferably being integral in the interests of economy and precise concentricity. At this point it should be observed that the expressions "front" and "rear" are relative and hence are used only for convenience. The cylinder of the head is here slightly larger than the shank 10 and determines the O. D. of the hole that is cut by cutting means, comprising a pair of cutting points 14, at the front of the head. These points are formed by grinding or otherwise shaping the front of the cylinder so that it is cut by a pair of crossed planes, represented in Figure 3 by the lines X—X, that cross at equal angles $a$, $a$, at the tool axis Y—Y. These planes lie respectively at opposite sides of a diameter D—D (Figure 5) on which the cutting points 14, 14 are alined. This diameter is included in the fore-and-aft or median plane of the tool, which plane coincides with the line 7—7 on Figure 4. Grinding on the planes X—X is preferred in original production of the tool as well as in subsequent sharpening, and for this reason the planes afford flat semicircular faces 16 running angularly and rearwardly from the respective points 14. By "semicircular" is meant the angular range or extent of each face 16, which is substantially 180°. Actually, each face is in the nature of a half-ellipse. The outer edge 18 of each face 16 follows the periphery of the cylinder 12 and this edge begins at one cutting point 14 and terminates at a back point 20 which lies approximately 180° angularly from said one cutting point and which is spaced axially rearwardly from the other cutting point a distance determined by the angles $a$, $a$. This distance also determines the maximum working depth of the tool; or, stated otherwise, the maximum thickness of stock that can be cut. The angles $a$, $a$ may be varied in the order of 10° to 75° with good results. The angles shown here are 60° and, since there are 180° at each side of the axis Y—Y, the angle between each plane X—X and the axis Y—Y is, in this particular illustration, also 60°. Where, however, the lower approximate limit for the angle $a$ is 10°, the angle between the plane X—X and the axis Y—Y would be 85° (180° minus 10° equals 170° and 170° divided by two equals 85°); and, where angle $a$ is at its approximate upper limit of 75°, the angle of the plane X—X to the axis Y—Y would be 52½° (180° minus 75° equals 105° and 105° divided by two equals 52½°). Hence, measuring the angle of the plane X—X to the axis Y—Y instead of to the other plane X—X, the variation may be in the order of 85° to 52½°. The cutting depth, measurable axially from 14 to 20 at either side of the head (since the cutting points 14 are coplanar in a radial plane normal to the tool axis), may be considered also to bear a relation to the diameter of the head. In the example shown, this axial distance is approximately one-half the diameter. Variations in the angles $a, a$ will of course change this proportion, and the amount of head ground off to provide the surfaces 16 will determine the strength of the head and cutting points 14. Such variations will depend upon the particular type of material for which the tool may be selected; viz., steel, aluminum, plastic etc. This pre-supposes that one will utilize a separate tool for each material; although, a single tool may be used universally with certain compromises expected as to results.

A line 22 runs axially along the periphery of the cylinder 12 from each back point or zone 20 to the axially alined cutting point 14, this detail being repeated of course at the diametrically opposite side of the head, since the cutting portions afforded by the planes X—X are symmetrical at opposite sides of the median plane 7—7. The line that runs diagonally from 14 to 20 in each case (at the inner edge of the respective plane X—X) lies generally in the median plane 7—7 and crosses the other corresponding diagonal at the axis Y—Y, and were it not for an axial bore or socket 24 in the head, the areas ahead of the faces 16 and exteriorly bounded by the respective edges 22 and the diagonals 14—20 would be triangles. As it is, however, these areas, designated at 26, are trapezoidal. As best seen in Figure 5, these areas are preferably slightly offset from the median plane 7—7, which is accomplished during the grinding or shaping operation and which is maintained when the tool is sharpened. As respects the direction of rotation of the tool in operation (counterclockwise as seen in Figure 5), the areas 26 are leading faces and the edges 18 are trailing. The faces 16 include both rake and relief as a result of their shape and disposition and sharpening the tool is a relatively simple matter since only the angles $a, a$ need be observed and maintained, which can be readily achieved in an appropriate fixture.

As best seen in Figure 7, the axial bore or socket 24 extends back into the tool body, somewhat rearwardly of the back end of the head, and forms a junction, which affords an annular shoulder 28, with a counterbore 30. The centering member C is received in the bore 24, being introduced through the open rear end of the counterbore 30 when the plug P is removed, the plug being a conventional externally threaded, recessed-head screw and the rear end of the counterbore being complementarily internally threaded at 32. The rear end of the centering member is headed or annularly flanged at 34 and this flange abuts the shoulder 28 to establish a stop or limit on forward projection of the centering member to a starting position to which it is biased by the spring S, which, received or housed in the counterbore 30, acts against the rear end of the member C and reacts against the front of the plug P.

The front end of the centering member C is conical and the apex affords a centering point 36. When the centering member is in its starting position (Figures 1–5 and 7), the point 36 is axially ahead of the cutting points 14, being biased to that position by the spring S. When the tool is used (for example in a drill press), it is brought down to the work, as at W; Figure 6. It is assumed that the center of the hole to be drilled in the work has been marked by crossed lines as is customary, and the centering point 36 is placed on the center so marked. It is a characteristic of this tool that the center on the work need not be centerpunched, although it may be if desired. However, on panels and particularly panels that are painted, enameled, etc., center-punching is undesirable because of its denting and paint-fracturing effect.

With the centering point 36 properly located on the work, axial pressure is applied to the tool, the spring load at S being appropriately calculated so that the work is held against radial shifting; and, as axial pressure continues, the cutting points 14 approach and engage the work. Stated otherwise, the centering member C is retracted relative to the cutting points. Since the tool is rotating, the cutting points 14 will cut on a circle having the point 36 as its center. The fit between the O. D. of the member C and the I. D. of the bore 24 is a precision fit, allowing both axial and angular movement of the member relative to the tool body without undesirable run-out or wobble. Maintenance of this factor assures precise concentricity.

As the tool starts into the work, the load of the spring and the friction at the front of the plug P and at the rear of the centering member are sufficient to cause the member to rotate with the tool body, but as axial pressure is applied, the friction is overcome and the centering member becomes stationary as the tool body continues to rotate. This eliminates burning of the point 36 and additionally stabilizes the work so that it may in most cases be held by hand without the use of vises or clamps as a contribution to the foregoing ability of the centering member to remain stationary during rotation of the rear radial face 38 of the centering member C and the front end 40 of the spring S are precision ground. To assure utmost precision, the rear end of the spring and the front end of the plug should be similarly treated, particularly since the spring S is apt to be turned end for end during disassembly and re-assembly. It is understood, of course, that the centering member is removed during sharpening of the cutter head.

The preferred design and operation of the tool have been disclosed, along with its major features and objects. Features and objects in addition to those elaborated herein will readily occur to those versed in the art, as will modifications and variations of the precise form of the invention disclosed, all of which may be achieved without departing from the spirit and scope of the invention.

What is claimed is:

1. A cutting tool of the class described, comprising: a tool body rotatable in a cutting direction about its principal axis and having a rear axial shank portion and a front head connected to the shank as a coaxial cylinder, said head having a front end and at least a pair of diametrically opposed cutting teeth on and projecting forwardly from said front end; each tooth having a sharp cutting point lying on the surface of the cylinder and further having a leading face and a trailing face; said leading face lying in a generally fore-and-aft plane substantially intersecting the tool axis and intersecting the surface of the cylinder to establish for said leading face a fore-and-aft outer edge that is generally an element of the cylinder and that extends rearwardly from the point, said trailing face lying in a single plane transversely oblique to the tool axis and intersecting the leading face at a straight front edge common to both of said faces, said front edge sloping radially inwardly and axially rearwardly from said point so that said point is axially forwardly of any other portion of the leading and trailing faces, and said trailing face inclining rearwardly from said front edge and meeting the surface of the cylinder at an outer arcuate edge beginning at said point and receding immediately circumferentially and rearwardly therefrom.

2. The invention defined in claim 1, in which: the obliqueness of the trailing face to the tool axis is in the order of from 52½° to 85°.

3. The invention defined in claim 1, in which: the head has an axial bore therein opening at the front end and affording an inner arcuate edge with each trailing face and a fore-and-aft inner edge for each leading face, and said head being formed to afford a bottom for each tooth so that each leading face is generally trapezoidal.

4. The invention defined in claim 3, including: a centering member carried in said bore and biased normally to a position axially forwardly of the cutting points.

5. The invention defined in claim 1, including: a centering member coaxially carried by said head and biased normally to a position axially forwardly of the cutting points.

6. A cutting tool, comprising: a tool body rotatable about its principal axis and having a rear axial shank portion and a front head joined to the shank as a coaxial cylinder, said head having a pair of forwardly projecting cutting points diametrically alined on the periphery of the cylinder and coplanar in a radial plane normal to said axis, the front end of said cylinder being cut at diametrically opposite sides of said axis by a generally fore-and-aft plane including said axis and the respective cutting point and being further cut transversely at opposite sides of said fore-and-aft plane by lateral planes diagonal to said axis and crossing generally at said axis, said fore-and-aft plane at each side of said axis affording a leading face and each lateral plane presenting a trailing face meeting the associated leading face at a straight front edge sloping radially inwardly and axially rearwardly, each trailing face inclining rearwardly and extending angularly from its front edge through substantially 180° and meeting the fore-and-aft plane at the opposite side of said axis at a junction rearwardly of the other front edge.

7. The invention defined in claim 6, in which: the angle of each lateral plane to the aforesaid axis is between 52½° and 85°.

8. The invention defined in claim 7, in which: the angle of each lateral plane to the fore-and-aft plane is on the order of 90°.

References Cited in the file of this patent

UNITED STATES PATENTS

| | | |
|---|---|---|
| 476,312 | Resche | June 7, 1892 |
| 1,285,350 | Palmgren | Nov. 19, 1918 |
| 2,444,099 | Hennessey | June 29, 1948 |
| 2,561,185 | Drake | July 17, 1951 |